UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

NITROAMIDOANTHRAQUINONE SULFO-ACID.

SPECIFICATION forming part of Letters Patent No. 643,451, dated February 13, 1900.

Application filed November 15, 1899. Serial No. 737,073. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of Nitroamidoanthraquinone Sulfo-Acids, of which the following is a specification.

It is known that diamido-anthraquinones can be readily converted into sulfo-acids which are wool-coloring matters yielding red to violet-red shades from the acid-bath. On account of their poor qualities in certain respects these coloring-matters have not hitherto been used practically in the dyeing industry.

My present invention consists in the production from these diamido-anthraquinone sulfo-acids of valuable new coloring-matters which I regard as nitro-diamido-anthraquinone sulfo-acids. To produce my new nitro coloring-matters, I can take either 1.4'-diamido-anthraquinone, (otherwise known as "1.5.-diamido-anthraquinone,") 1.3-diamido-anthraquinone, (otherwise known as "alpha-diamido-anthraquinone,") or 1.1'-diamido-anthraquinone, (otherwise known as "1.8- or delta-diamido-anthraquinone.") These bodies are converted into their known sulfo-acids and then nitrated, as hereinafter described, by treatment with nitric acid in the presence of sulfuric and boracic acids. They dye chrome-mordanted wool giving blue-violet to brown-violet shades which are very fast to light.

In the present application for patent I desire to claim, generically, the new nitro-amido-anthraquinone sulfo-acids, and, specifically, I desire to claim that nitro-amido-anthraquinone sulfo-acid which can be obtained from 1.4'-diamido-anthraquinone.

The following example will serve to further illustrate the manner in which my invention can be carried into practical effect and my new coloring-matters obtained:

Example: Mix together about ten (10) parts of 1.4'- (or 1.5-) diamido-anthraquinone and ten (10) parts of dried boracic acid. Add this mixture to about two hundred (200) parts of sulfuric-acid monohydrate. Add to the melt two hundred (200) parts of fuming sulfuric acid, (containing about forty per cent. $SO_3$.) Heat the mixture to about 115° centigrade and maintain it at this temperature until a test portion is completely soluble in water. Allow the melt to cool. Prepare six and a half ($6\frac{1}{2}$) parts of a cold mixture of nitric and sulfuric acids containing eighty-five per cent. $HNO_3$. Run this cold mixture into the cold melt, stir thoroughly, and cool continuously, so that the temperature of the mixture constantly remains below 10° centigrade. When the mixture has been effected, stir for about twelve hours at the ordinary temperature. Then pour the melt into ice-water and salt out the nitro product obtained with potassium chlorid or common salt. Filter and dry. The sulfo-acids of 1.3- (alpha) and 1.1.' (1.8- or delta-) diamido-anthraquinones may similarly be converted into my new nitro coloring-matters.

The foregoing example may be varied in many ways. For instance, instead of taking the melt containing diamido-anthraquinone sulfo-acids isolated diamido-anthraquinone sulfo-acids can be dissolved in sulfuric acid and nitrated in the manner described.

My new coloring-matters possess the generic and specific properties respectively indicated in the following table:

| | Nitro coloring-matter from the sulfo-acids of— | | |
|---|---|---|---|
| | 1.4'-diamido-anthraquinone. | 1.3-diamido-anthraquinone. | 1.1'-diamido-anthraquinone. |
| Color of the solution in— | | | |
| Water | Red-violet | Brown-violet | Brown. |
| Carbonate-of-soda solution. | Dirty-blue violet. | Dull violet | Dull violet. |
| Caustic-soda lye. | ....do | Olive | Violet-brown. |
| Concentrated sulfuric acid. | Violet | Brown-red | Brown. |
| Color on chrome-mordanted wool. | Bluish violet. | Brown-violet | Violet-brown. |

Now what I claim is—

1. The new coloring-matters which can be obtained by treating diamido-anthraquinone sulfo-acids with nitric acid and which are characterized by the following properties: they are chemically nitration products of amido-anthraquinone sulfo-acids, soluble in water, soluble in carbonate-of-soda solution, and in caustic-soda lye, and which dye chrome-mordanted wool giving from bluish-violet to brown-violet shades, all substantially as described.

2. The new coloring-matter which can be obtained by treating sulfo-acids of 1.4'-diamido-anthraquinone with nitric acid, and which is chemically a nitration product of 1.4'-diamido-anthraquinone, which is soluble in water, giving a red-violet solution, and in carbonate-of-soda and caustic-soda solution, giving dirty-blue violet solution, soluble in concentrated sulfuric acid giving a violet color, all substantially as hereinbefore described.

In testimony whereof I have hereunto set my hand in the presence of two subscribing witnesses.

OSCAR BALLY.

Witnesses:
ERNEST F. EHRHARDT,
RENÉ BOHN.